March 11, 1958 W. R. BRUHN 2,825,994
TROLLING DEVICE WITH DEPTH CONTROLLING MEANS
Filed April 17, 1956
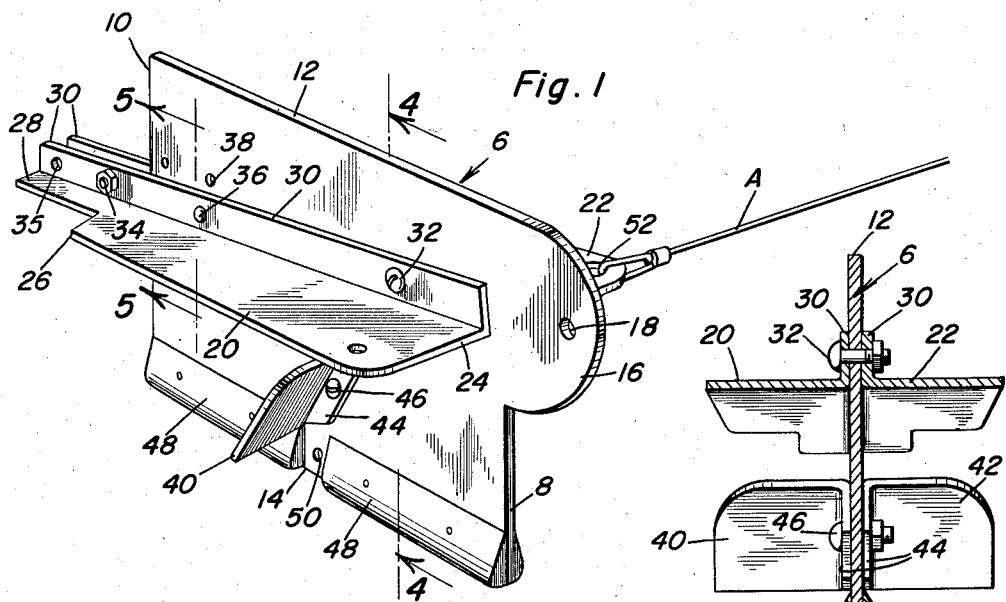
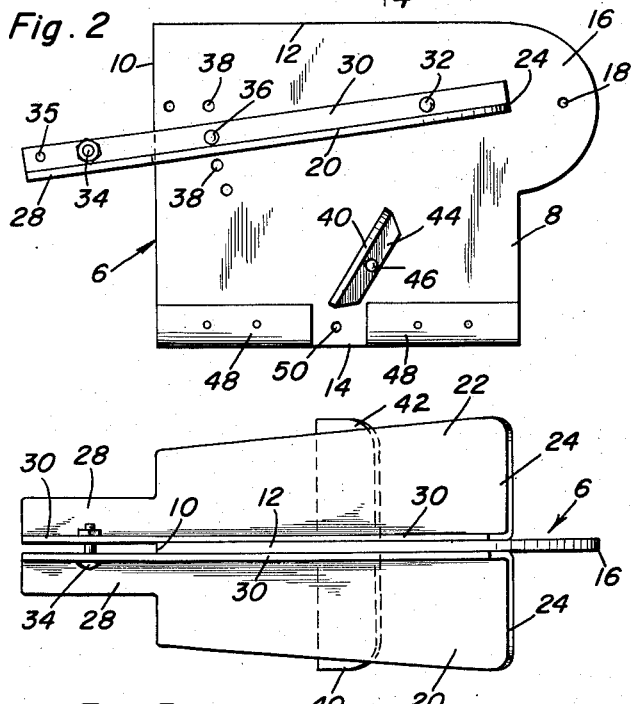
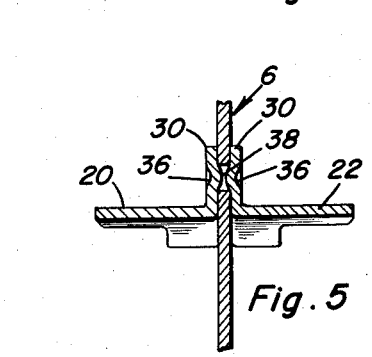
William R. Bruhn
INVENTOR.
BY *Clarence A. O'Brien*
*and Harvey B. Jacobson*
Attorneys

United States Patent Office 2,825,994
Patented Mar. 11, 1958

2,825,994

TROLLING DEVICE WITH DEPTH CONTROLLING MEANS

William R. Bruhn, Grass Valley, Calif., assignor of one-half to Edna M. Bruhn, Grass Valley, Calif.

Application April 17, 1956, Serial No. 578,740

3 Claims. (Cl. 43—43.13)

This invention relates to a trolling device characterized by a flat-faced generally rectangular plate or blade provided on opposite vertical sides with outstanding wing-like vanes and cooperating stabilizing fins which, when they are manually adjusted relative to each other, make it possible for the device to function at a desired depth.

The construction is such that a number of factors and components contribute to the over-all construction and use and make it possible to rely upon the factors of ballast, balance, side pressure from either side and the utilization of wings and stabilizers to overcome handicaps and difficulties attending prior art trolling devices having depth control means of one type or another.

An object of the invention is to make it possible for a fisherman to fish as deep and as far to his right or left as is normally expected or desired. To this end a device is provided which when used in swift stream fishing or from ashore will hold the troll some 20 feet more or less away from the shore with approximately 100 feet of line in the water. The construction is also such that by attaching a sinker with a so-called dead line and when fishing for salmon, for example, in fast streams the desired trolling action at the desired depth may be attained and, when the sinker hits the bottom the device will come up the length of the dead line.

Another object of the invention is to provide a construction which when fishing, for example, for bass, instead of casting from shore, it is possible to troll the plug and bait as close to the shore as desired, and when fishing for trout, the user can fish either at shallow or deep levels.

Other objects, features and advantages will become more readily apparent from the following description and the accompanying sheet of illustrative drawings.

In the drawing:

Fig. 1 is a perspective view of the improved trolling device with the depth controls on one side visible;

Fig. 2 is a side elevation;

Fig. 3 is a top plan view; and,

Figs. 4 and 5 are sections on the lines 4—4 and 5—5, respectively, of Fig. 1.

The body part is denoted by the numeral 6 and comprises a flat-faced generally rectangular plate or blade having a front or leading edge 8, rear or trailing edge 10, upper lengthwise edge 12, lower edge 14 parallel to the upper edge and a marginally rounded nose-like extension between the upper portion of the leading edge 8 and forward end of the top edge 12 and denoted by the numeral 16. This is provided with a line attaching hole 18.

Attached to the opposite left and right sides of the blade or plate are depth regulating and controlling members which may be designated as wing-like vanes or planes 20 and 22. These are substantially identical in construction and they are gradually reduced in width from their forward ends 24 toward their rearward ends 26 where they are notched and then made relatively narrow as at 28. The inward longitudinal edge of each wing or vane is provided with a vertically disposed lengthwise flange 30 which is coextensive in length with the vane proper and which has its forward end portion detachably and hingedly mounted by way of a bolt 32 on the intermediate forward half portion of the plate. A single bolt 32 serves to hingedly mount both left and right vanes 20 and 22. It will be noticed that the vanes are sufficiently long that the rearward flanged ends extend beyond the trailing end 10 where they too are secured together by way of clamping bolt 34. Bolt holes 35 are provided for adjustable mounting of the bolt 34. The intermediate portion of each flange is provided with an indentation or boss which constitutes a detent 36. The detents are selectively engageable with the keeper holes 38 formed in the rearward upper portion of the plate. This facilitates adjusting the vanes up and down on the hinging bolt 32.

The rudder-like members are here designated as left and right stabilizing fins 40 and 42 and here again these are identical and they have downturned flanges 44 which embrace and are adjustably and detachably bolted on opposite sides of the plate as at 46. These stabilizers are beneath the outstanding vanes 24 and above the lower edge 14. The lower edge 14 is provided on opposite sides with suitable lead weights or ballast members 48. The hole 50 is to accommodate, if desired, added sinker or weight means.

As is generally well evident from the disclosure the device is capable of being regulated to either ascend or descend when in use in the water to the intended or desired depth. For example by setting the vanes or wing-like planes 20 and 22 in approximately opposed horizontal relationship the stabilizing fins 40 and 42 may be adjusted as desired. That is to say, it is possible to set the outside fin (away from the boat) to dip water and the inside fin just the reverse, that is to push up. The fishing line A may be fastened to the wing 22 at 52 so that for every 100 feet of line the device will go down approximately 10 feet. The wings 20 and 22 may also be regulated or tilted to bring the device nearer to the surface if so desired.

The stabilizer fins 40 and 42 hold the device on an even keel. Without them it would float on its side. Hooking the line in the one wing allows the device to pull off center and travel to the right or left as desired. This makes it possible for two fishermen to fish about 50 feet apart with 100 feet of line in the water.

The invention will be made in several sizes but the principle remains the same. An all purpose model will take care of most fresh water fishing and will handle any fish up to fifty pounds. The lure must always be hooked straight behind neutral position or it will affect the device, making it tilt either up or down. However, handled correctly, it will be highly effective.

Changes in shape, size, materials and rearrangement of parts may be resorted to in actual practice without departing from the scope of the claims if desired.

What is claimed as new is as follows:

1. A balanced trolling device comprising, in combination, an elongated flat-faced plate of general rectangular form adapted to assume a vertical position when being trolled in a body of water, said plate having a lower keel-forming edge, ballast weights fixed to opposite vertical sides of the plate and cooperable with said lower edge, a first wing-like right angularly disposed elongated vane having a lateral flange along its inner edge, a second right angularly disposed substantially duplicate vane extending lengthwise along the other side of said plate, and also having a longitudinal flange contacting the plate, the forward end portions of the respective flanges being hingedly bolted to the upper forward portion of said plate, the rearward upper portion of said plate having a plurality of selectively usable keeper holes, the cooperating portions of the flanges having indentations providing detents and said detents being engageable with said keeper holes, the rearward end portions of the flanges extending well beyond the rearward edge of said plate and being provided with selectively usable bolt holes, and an insertable and removable bolt passing through a selected registered pair of bolt holes, said bolt serving to assist one in shifting the rear end portions of the vanes up and down and functioning to clamp the flanges against opposite sides of the plate and to assist in forcing and pressing the detents into the keeper holes, and stabilizing fins adjustably mounted on the respective opposite sides of said plate and situated beneath the intermediate portions of the respective overhanging vanes.

2. A trolling device comprising an elongated flat-faced plate adapted to assume a vertical position when in use in a body of water, said plate having keeper holes therein, the lower edge of said plate constituting a keel and being provided with weights, a pair of longitudinally disposed laterally and outwardly projecting wing-like vanes extending along the opposite sides of the upper portion of said plate and having their forward ends hingedly attached to the forward upper portion of the plate, having their rearward ends extending beyond the rearward end portion of the plate and clampingly connected together and their intermediate portions provided with detents selectively engageable with the keeper holes provided therefor in the plate, and a pair of oblique angled stabilizing fins cooperable with and lateral to said vanes and detachably and adjustably mounted intermediate their ends on the respective sides of the median lower portion of said plate and occupying positions beneath the intermediate portions of their respective vanes.

3. A trolling device comprising a flat-faced substantially rectangular plate adapted to travel in an approximately vertical position when trolled through a body of water and having linearly straight top and bottom edges, a straight vertical trailing edge, a leading edge vertically disposed and extending upwardly from the bottom edge to a point midway of the plate, the upper leading end portion of the plate having a forward extension with a rounded marginal leading edge projecting beyond said leading edge of said plate and apertured to accommodate a line, and manually adjustable depth regulating and control means for said plate comprising a pair of lengthwise right angularly disposed outstanding vanes extending along the respective opposite sides of the upper portion of said plate, the forward ends of said vanes being hingedly and tiltably mounted on said plate adjacent the forward end of the plate, the intermediate portions of the vanes being adjustably mounted on the rearward intermediate portion of said plate, the rearward end portions of said vanes extending beyond the vertical trailing edge of said plate and being separably and clampingly bolted together, and a pair of relatively short oblique angled and laterally outstanding stabilizing fins detachably and adjustably mounted intermediate their upper and lower ends on the lower intermediate portion and on the respective opposite vertical sides of said plate, said fins being adjustable relative to their respective vanes to regulate the depth control requirements of the over-all device, said fins being located beneath the forward hingedly mounted end portions of their respective vanes.

References Cited in the file of this patent

UNITED STATES PATENTS

| | | |
|---|---|---|
| 1,320,804 | Squarebriggs | Nov. 4, 1919 |
| 2,542,347 | Muller | Feb. 20, 1951 |
| 2,545,185 | Winslow | Mar. 13, 1951 |
| 2,741,863 | Magill | Apr. 17, 1956 |

FOREIGN PATENTS

| | | |
|---|---|---|
| 172,140 | Great Britain | Dec. 8, 1921 |